(12) United States Patent
Zhang et al.

(10) Patent No.: US 9,986,257 B2
(45) Date of Patent: May 29, 2018

(54) METHOD OF LOOKUP TABLE SIZE REDUCTION FOR DEPTH MODELLING MODE IN DEPTH CODING

(71) Applicant: HFI Innovation Inc., Zhubei, Hsinchu County (TW)

(72) Inventors: Xianguo Zhang, Beijing (CN); Kai Zhang, Beijing (CN); Jian-Liang Lin, Su'ao Township, Yilan County (TW); Jicheng An, Beijing (CN); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days. days.

(21) Appl. No.: 15/816,946

(22) Filed: Nov. 17, 2017

(65) Prior Publication Data

US 2018/0084276 A1    Mar. 22, 2018

Related U.S. Application Data

(62) Division of application No. 15/509,831, filed as application No. PCT/CN2015/086469 on Aug. 10, 2015, now Pat. No. 9,860,562.

(30) Foreign Application Priority Data

Sep. 30, 2014  (WO) ................ PCT/CN2014/088007
Sep. 30, 2014  (WO) ................ PCT/CN2014/088038

(51) Int. Cl.
*G06K 9/36*    (2006.01)
*H04N 19/593*  (2014.01)
(Continued)

(52) U.S. Cl.
CPC ......... *H04N 19/593* (2014.11); *H04N 19/146* (2014.11); *H04N 19/597* (2014.11)

(58) Field of Classification Search
None
See application file for complete search history.

(56) References Cited

U.S. PATENT DOCUMENTS 9,369,708 B2    6/2016   Zhang
9,516,306 B2    12/2016  Zhang
(Continued)

FOREIGN PATENT DOCUMENTS

CN        103281541 A    9/2013
CN        103974063 A    8/2014
WO     WO 2014/108088 A1  7/2014

OTHER PUBLICATIONS

S. Ma, Y. Wang, C. Zhu, Y. Lin and J. Zheng, "Reducing Wedgelet lookup table size with down-sampling for depth map coding in 3D-HEVC," 2015 IEEE 17th International Workshop on Multimedia Signal Processing (MMSP), Xiamen, 2015, pp. 1-5.*

(Continued)

*Primary Examiner* — Andrae S Allison
(74) *Attorney, Agent, or Firm* — McClure, Qualey & Rodack, LLP

(57) ABSTRACT

A method and apparatus of depth coding using depth modelling mode 1 (DMM1) are disclosed to reduce the wedgelet pattern table size. In one embodiment, a size-reduced wedgelet pattern for a reduced wedgelet pattern table is generated by excluding at least one non-corner adjacent-edge sample for adjacent-edge partition or at least one opposite-edge sample for opposite-edge partition from starting positions or from ending positions. The reduced wedgelet pattern table may also include at least one omitted wedgelet pattern in at least one wedgelet direction category. For the adjacent-edge partition, the starting positions and the ending positions may correspond to every other even non-corner adjacent-edge samples in a first and a second adjacent edges respectively. For the opposite-edge partition, the starting positions (Continued)

correspond to every other even opposite-edge samples in a first opposite edge and the ending positions include all opposite-edge samples in a second opposite edge.

15 Claims, 4 Drawing Sheets

(51) Int. Cl.
*H04N 19/146* (2014.01)
*H04N 19/597* (2014.01)

(56) References Cited

U.S. PATENT DOCUMENTS

| | | | | |
|---|---|---|---|---|
| 9,860,562 | B2* | 1/2018 | Zhang | H04N 19/593 |
| 2011/0038418 | A1 | 2/2011 | Pandit | |
| 2011/0122225 | A1 | 5/2011 | Kim | |
| 2012/0229602 | A1 | 9/2012 | Chen | |
| 2013/0077684 | A1* | 3/2013 | Chen | H04N 19/503 375/240.13 |
| 2013/0229485 | A1* | 9/2013 | Rusanovskyy | H04N 13/0048 348/43 |
| 2014/0002594 | A1* | 1/2014 | Chan | H04N 19/597 348/43 |
| 2014/0247872 | A1* | 9/2014 | Merkle | H04N 19/00769 375/240.12 |
| 2014/0294061 | A1* | 10/2014 | Zhang | H04N 19/597 375/240.02 |
| 2014/0301454 | A1* | 10/2014 | Zhang | H04N 13/0048 375/240.12 |
| 2015/0326866 | A1 | 11/2015 | Ikai | |
| 2016/0029038 | A1* | 1/2016 | Zhao | H04N 19/119 375/240.12 |
| 2016/0057417 | A1 | 2/2016 | Kawamura | |
| 2016/0241835 | A1* | 8/2016 | Ikai | H04N 19/70 |
| 2016/0309153 | A1 | 10/2016 | Merkle | |
| 2016/0330479 | A1* | 11/2016 | Liu | H04N 19/597 |
| 2017/0142442 | A1* | 5/2017 | Tsukuba | H04N 19/597 |
| 2017/0302960 | A1* | 10/2017 | Zhang | H04N 19/593 |

OTHER PUBLICATIONS

Muller et al , 3D High-Efficiency Video Coding for Multi-View Video and Depth Data, IEEE Transactions on Image Processing, vol. 22, No. 9, Sep. 2013.*

Zhoa et al, An efficient depth modeling mode decision algorithm for 3D-HEVC depth map coding, vol. 127, Issue 24, Dec. 2016, pp. 12048-12055.*

Zhang, Mengmeng, et al. "A fast depth-map wedgelet partitioning scheme for intra prediction in 3D video coding." Circuits and Systems (ISCAS), 2013 IEEE International Symposium on. IEEE, 2013.*

International Search Report dated Nov. 24, 2015, issued in application No. PCT/CN2015/086469.

Lucas, et al.; "Compression of Depth Maps Using Predictive Coding, Efficient Predictive Algorithms for Image Compression;" https://link.springer/com/chapter/10.1007/978-3-319-51180-1_4; Feb. 2007; pp. 65-95.

Merkle, P., et al.; "3D Video: Depth Coding Based on Inter-Component Prediction of Block Partitions;" Proceedings of the Picture Coding Symposium; PCS; 2012; pp. 149-152.

Mekrle, P., et al.; "Coding of Depth Signals for 3D Video Using Wedgelet Block Segmentation with Residual Adaptation;" Proceedings of the IEEE International Conference on Multimedia and Expo, ICME; 2013; pp. 1-6.

Merkle, P., et al.; "Depth Intra coding for 3D Video Based on Geometric Primitives;" IEEE Transactions on Circuits and System for Video Technology; vol. 26; No. 3; Mar. 2016.

Zhang, et al.; "Optimization of Depth Modelling Modes in 3D-HEVC Depth Intracoding;" J Real-Time Image Proc; 2017; 13:85-100.

Lucas, L.F.R., et al.; "Predictive Depth Map Coding for Efficient Virtual View Synthesis;" Image Processing (ICIP); 20th IEEE International Conference on. IEEE; 2013.

Muller, K., et al.; "3D High-Efficiency Video Coding for Multi-View Video and Depth Data;" IEEE Transactions on Image Processing; vol. 22; No. 9; Sep. 2013; pp. 3366-3378.

Tsukuba, T., et al.; "Lookup table size reduction in DMM1;" Joint Collaborative Team on 3D Video Coding Extensions of ITU-T SG 16 WP 3 and ISO/IEC JTC 1/SC 29/WG 11; Jul. 2014; pp. 1-11.

Tech, G., et al.; "3D-HEVC Draft Text 5;" Joint Collaborative Team on 3D Video Coding Extensions of ITU-T SG 16 WP 3 and ISO/IEC JTC 1/SC 29/WG 11; Jul. 2014; pp. 1-94.

Zhang, X., et al.; "On Lookup Table Size Reduction for DMM1;" Joint Collaborative Team on 3D Video Coding Extensions of ITU-T SG 16 WP 3 and ISO/IEC JTC 1/SC 29/WG 11; Oct. 2014; pp. 1-22.

* cited by examiner

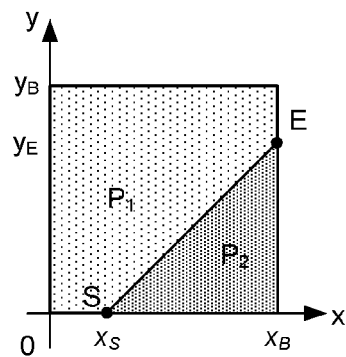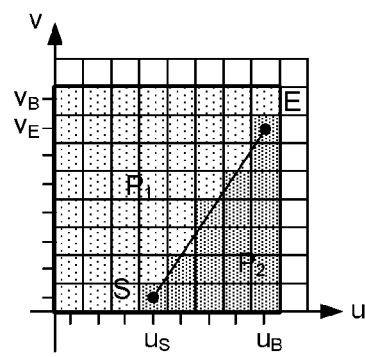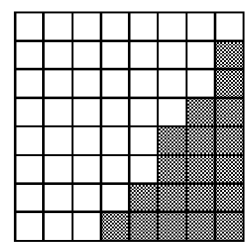
Fig. 1A  Fig. 1B  Fig. 1C
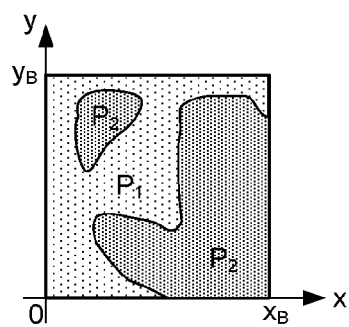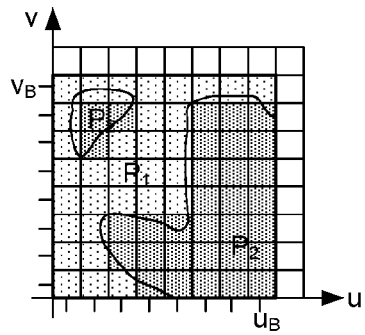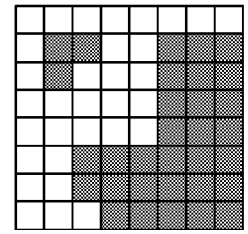
Fig. 2A  Fig. 2B  Fig. 2C

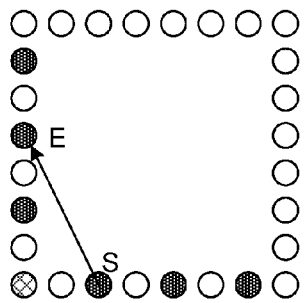
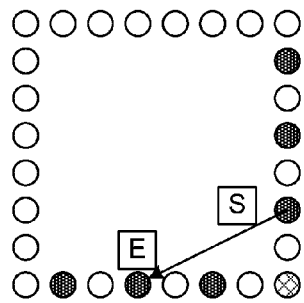
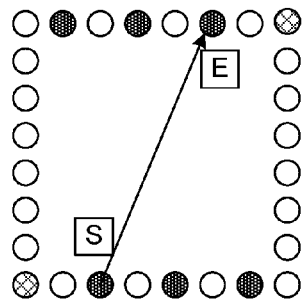
Fig. 4A  Fig. 4B  Fig. 4C
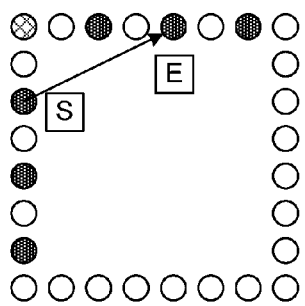
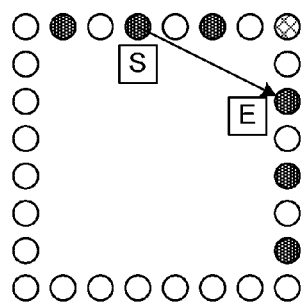
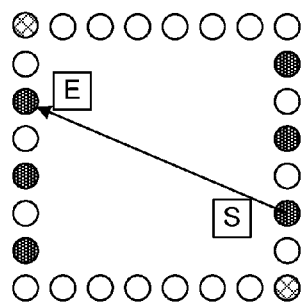
Fig. 4D  Fig. 4E  Fig. 4F
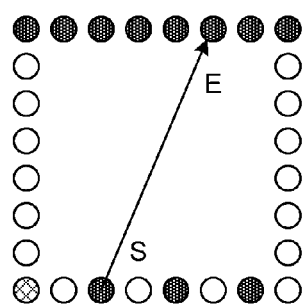
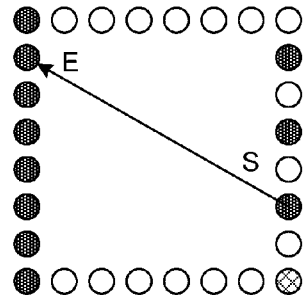
Fig. 5A  Fig. 5B

METHOD OF LOOKUP TABLE SIZE REDUCTION FOR DEPTH MODELLING MODE IN DEPTH CODING

CROSS REFERENCE TO RELATED APPLICATIONS

The present invention is a Divisional of pending U.S. application Ser. No. 15/509,831, filed on Mar. 8, 2017, which is a National Phase of PCT Patent Application No. PCT/CN2015/086469, filed on Aug. 10, 2015, which is a Continuation-In-Part PCT Patent Application, Serial No. PCT/CN2014/088038, filed on Sep. 30, 2014 and PCT Patent Application, Serial No. PCT/CN2014/088007, filed on Sep. 30, 2014. The PCT Patent Applications are hereby incorporated by reference in their entireties.

TECHNICAL FIELD

The present invention relates to depth coding in a three-dimensional and multi-view video coding system. In particular, the present invention relates to lookup table size reduction for depth modelling mode 1 (DMM1) in depth coding.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. In three-dimensional and multi-view coding systems, the texture data as well as depth data are coded.

Various coding tools have been developed to enhance the depth picture coding efficiency. Among these tools, the two Depth Modeling Modes (DMM1 and DMM4) have been adopted into three-dimensional (3D) video coding standard such as 3D video coding based on High Efficiency Video Coding (3D-HEVC) to improve the Intra prediction efficiency of depth pictures. DMM1 and DMM4 are based on wedgelet and contour partitioning respectively. For a wedgelet partition, the two regions are separated by a straight line, as illustrated in FIG. 1A through FIG. 1C, where the two regions are labelled with P1 and P2. The separation line is determined by a start point S and an end point E, both located on different edges of the block as shown in FIG. 1A, which illustrates a case for the continuous signal and the separation line can be described by an equation for a straight line. FIG. 1B illustrates a case for the discrete sample space, where the block consists of an array of samples with a block size uB×vB and the start and end points correspond to edge samples. Though the separation line can be described by a line equation for the discrete space as well, each boundary sample between regions P1 and P2 may not be entirely on one side of the boundary line. Since each entire sample at the boundary has to be assigned to one of the two regions, a boundary sample may appear to be on both sides of the boundary line as shown in FIG. 1B. In order to use the wedgelet block partitions in the coding process, the partition information is stored in the form of partition patterns (also referred as wedgelet patterns). The partition pattern consists of an array of uB×vB binary data to indicate whether the sample belongs to region P1 or P2. The regions P1 and P2 are represented by black and white samples respectively in FIG. 1C. The term "wedgelet" may also be referred as "wedge" in this disclosure.

Unlike the wedgelets, the separation line between the two regions of a contour partition of a block cannot be easily described by a geometrical function. FIG. 2A thought FIG. 2C illustrate examples of contour partition of a block, where the block consists of two arbitrary shaped regions P1 and P2, and P2 consist of multiple parts. FIG. 2A illustrates an example of arbitrary shaped contour partition for the continuous space. FIG. 2B illustrates an example of arbitrary shaped contour partition for the discrete space. Other than separation by a line or an arbitrary shaped contour, wedgelet and contour partitions are very similar. In order to use the contour partitions in the coding process, the partition information is also stored in the form of partition patterns. FIG. 2C illustrates an example of binary pattern corresponding to the contour partition in FIG. 2B. The binary pattern has to be derived individually for each block from the signal of a reference block. Due to the lack of a functional description of the arbitrary shaped contour line between regions, no pattern lookup lists can be used. Consequently no search of the best matching partition can be used for contour partitions.

While DMM1 has the advantage of significant BD-Rate savings, the number of wedgelet patterns for DMM1 requires a large table in both the encoder and the decoder to store the candidate patterns for Intra prediction. The BD-Rate is a well-known performance measure used in video coding system. Table 1 lists the size of each wedgelet pattern table for each Intra PU size in the 3D-HEVC Draft Text 5 (Tech et al., 3D-HEVC Draft Text 5, Joint Collaborative Team on 3D Video Coding Extensions of ITU-T SG 16 WP 3 and ISO/IEC JTC 1/SC 29/WG 11, 9th Meeting: Sapporo, J P, 3-9 Jul. 2014, Document: JCT3V-I1001).

TABLE 1

| PU size | Number of wedgelet patterns | Number of bits for one wedgelet pattern | Total bits | Accumulated bits | Bits ratio [%] |
|---|---|---|---|---|---|
| 4 × 4 | 86 | 16 | 1,376 | 1,376 | 0.35% (1376/396000) |
| 8 × 8 | 766 | 64 | 46,024 | 50,400 | 11.62% (46024/396000) |

TABLE 1-continued

| PU size | Number of wedgelet patterns | Number of bits for one wedgelet pattern | Total bits | Accumulated bits | Bits ratio [%] |
|---|---|---|---|---|---|
| >=16 × 16 | 1,350 | 256 | 345,600 | 396,000 | 87.27% (345600/396000) |

The wedgelet patterns of DMM1 can be classified into six direction categories (also referred as wedgelet direction categories), as shown in FIG. 3A through FIG. 3F. The six direction categories include four corner directions, vertical direction and horizontal direction. For corner directions (also referred as adjacent-edge partitions), the edge line starting positions and ending positions are on two adjacent edges joined by the corner sample. For example, the starting positions are in the edge corresponding to the row of samples at the bottom in FIG. 3A. The ending positions are located in the edge corresponding to the column of samples at the left in FIG. 3A. For the opposite-edge directions (i.e., vertical and horizontal in FIG. 3C and FIG. 3F respectively), the two edges for the starting and ending positions are on the opposite sides. The opposite-edge directions may also referred as opposite-edge partitions. As shown above, the table size for DMM1 is quite large. Therefore, it is desirable to develop a method to reduce the wedgelet pattern table size. However, reducing the wedgelet pattern table size may cause impact on the coding efficiency. Furthermore, it is desirable that the reduced wedgelet pattern table size will have very small or no impact on the coding efficiency.

In the current 3D-HEVC described in JCT3V-I1001, the table index in DMM1 is binarized as a fixed-length code as described in the syntax table (Table 2) and in the binarization table (Table 3).

TABLE 2

| | Descriptor |
|---|---|
| if( DepthIntraMode[x0][y0] == INTRA_DEP_DMM_WFULL ) | |
|     wedge_full_tab_idx[x0 ][y0] | ae(v) |

TABLE 3

| wedge_full_tab_idx | FL | cMax = wedgeFullTabIdxBits[log2PbSize] |
|---|---|---| where cMax represents the code bit length of the fixed length code and wedge_full_tab_idx[x0][y0] specifies the index of the wedgelet pattern in the corresponding pattern list when DepthIntraMode[x0][y0] is equal to INTRA_DEP_ DMM_WFUL.

The wedgelet pattern can be determined according to: wedgePattern=WedgePatternTable[Log 2(nTbS)][wedge_full_tab_idx[xTb][yTb]], where WedgePatternTable[log2BlkSize] represents the list used to store binary partition patterns for a block with a block size $2^{log2BlkSize} \times 2^{log2BlkSize}$.

NumWedgePattern[log2BlkSize] specifies the number of binary partition patterns in list WedgePatternTable[log2BlkSize].

The wedgelet pattern table WedgePatternTable[log2BlkSize] is constructed according to a pre-defined algorithm and the number of wedgelet patterns NumWedgePattern[log2BlkSize] is also determined by this algorithm. Table 4 illustrates NumWedgePattern[log2BlkSize] for different log2BlkSize.

TABLE 4

| | NumWedgePattern | | | | |
|---|---|---|---|---|---|
| log2PbSize | 2 | 3 | 4 | 5 | 6 |
| Value | 86 | 766 | 1350 | 1350 | — |

Table 5 illustrates wedgeFullTabIdxBits[log2Pb Size] for different log2BlkSize.

TABLE 5

| Initialization variable | wedgeFullTabIdxBits | | | | |
|---|---|---|---|---|---|
| log2PbSize | 2 | 3 | 4 | 5 | 6 |
| Value | 7 | 10 | 11 | 11 | 13 |

The terms Log2(nTbS), log2PbSize and log2BlkSize mentioned above have the same meaning.

A problem occurs for the following case:
NumWedgePattern[log2BlkSize]< $2^{wedgeFullTabIdxBits[log2BlkSize]}$.

When the above case occurs, the decoder may encounter a bitstream that signals a wedge_full_tab_idx larger than or equal to NumWedgePattern[log2BlkSize]. Since WedgePatternTable[log2BlkSize] is constructed with only NumWedgePattern [log2BlkSize] entries, the access of WedgePatternTable[log2BlkSize] [wedge_full_tab_idx] with wedge_full_tab_idx>=NumWedgePattern[log2BlkSize] undefined will cause an unpredictable results or an error. Accordingly, it is desirable to develop a method for wedgelet tables to overcome the issue.

SUMMARY

A method and apparatus of depth coding using depth modelling mode 1 (DMM1) for a depth block in a three-dimensional (3D) or multi-view video coding system are disclosed to reduce the wedgelet pattern table size. In one embodiment, a size-reduced wedgelet pattern for a reduced wedgelet pattern table is generated by excluding at least one non-corner adjacent-edge sample for adjacent-edge partition or at least one opposite-edge sample for opposite-edge partition from starting positions or from ending positions. The reduced wedgelet pattern table may also include at least one omitted wedgelet pattern in at least one wedgelet direction category. A depth block is then encoded or decoded according to the DMM1 mode using the reduced wedgelet pattern table. The depth block may correspond to a prediction unit (PU).

In one embodiment, for the adjacent-edge partition, the starting positions and the ending positions correspond to every other even non-corner adjacent-edge samples in a first adjacent edge and in a second adjacent edge respectively. For the opposite-edge partition, the starting positions correspond to every other even opposite-edge samples in a first opposite edge and the ending positions include all opposite-edge samples in a second opposite edge. In one embodiment, the even-position samples correspond to edge samples with distances between the selected samples and the same-row-or-column corner point being even numbers. In another embodiment, the reduced wedgelet pattern table including the size-reduced wedgelet pattern is applied to the depth block only when the depth block corresponds to a prediction unit with a block size equal to or larger than 16×16.

The reduced wedgelet pattern table may comprise at least one size-reduced wedgelet pattern in each wedgelet direction category. The starting positions or the ending positions may correspond to every k-th non-corner adjacent-edge samples with phase t, where k is a positive integer and t is a non-negative integer smaller than k. In one embodiment, at least one non-corner adjacent-edge sample for adjacent-edge partition or at least one opposite-edge sample for opposite-edge partition excluded from the starting positions or from the ending positions may depend on a block size of the depth block or a wedgelet direction category. For example, at least one non-corner adjacent-edge sample for adjacent-edge partition or at least one opposite-edge sample for opposite-edge partition is excluded from the starting positions or from the ending positions only for the block size of the depth block equal to or larger than a threshold. The reduced wedgelet pattern table may include at least one omitted wedgelet pattern in at least one wedgelet direction category only for a block size of the depth block equal to or larger than a threshold. Alternatively, at least one omitted wedgelet pattern can be included only for a block size of the depth block smaller than a threshold.

The reduced wedgelet pattern table for a current depth block can be used as a shared wedgelet pattern table by another depth block having a different block size from the current depth block. The table size of the reduced wedgelet pattern table can be pre-defined to a fixed value for each block size of the depth block, and a required table size associated with the number of wedgelet candidates is no larger than the fixed value for each block size of the depth block.

In another embodiment, different block sizes may share a same wedgelet pattern table. The wedgelet patterns for a larger block size may be down-scaled and used by a depth block with a smaller block size. Alternatively, the wedgelet patterns for a smaller block size may be up-scaled and used by a depth block with a larger block size.

In yet another embodiment, an available number of wedgelet patterns for reduced wedgelet pattern table can be determined. The available number of wedgelet patterns is smaller than a total number of wedgelet patterns including all wedgelet patterns for all wedgelet direction categories. A candidate wedgelet pattern can be added to a current reduced wedgelet pattern table until the current reduced wedgelet pattern table is full. A depth block is then encoded according to DMM1 mode using the last reduced wedgelet pattern table.

Another aspect of the present invention addresses reconstruction of the wedgelet pattern table for all possible wedgelet pattern indices. According to some embodiments, the wedgelet pattern index is constrained to a constrained wedgelet pattern index to always point to a valid entry in a wedgelet pattern table. A wedgelet pattern is then retrieved from the wedgelet pattern table using the constrained wedgelet pattern index and the current depth block is decoded according to DMM1 mode using the wedgelet pattern retrieved. For example, the wedgelet pattern index can be clipped to less than the total number of wedgelet patterns. In another example, the wedgelet pattern index can be clipped to a range from zero to a total number of wedgelet patterns minus one. Furthermore, the wedgelet pattern index can be constrained to the constrained wedgelet pattern index by assigning a fixed valid index to the constrained wedgelet pattern index, or assigning a valid index depending on the wedgelet pattern index. The wedgelet pattern index can also be determined from the video bitstream by parsing a variable length code, where the variable length code is decoded into an index range from zero to a total number of wedgelet patterns minus one.

In yet another embodiment, all wedgelet pattern table entries are constructed so that any received wedgelet pattern index will point to a valid wedgelet pattern. For example, for any wedgelet pattern table entries with index no less than the total number of wedgelet patterns in the wedgelet pattern table, these wedgelet pattern entries with indices no less than the total number of wedgelet patterns can be filled with existing wedgelet pattern entries with an index range from zero to the total number of wedgelet patterns minus one or using new wedgelet pattern entries different from existing wedgelet pattern entries with the index range from zero to the total number of wedgelet patterns minus one. These wedgelet pattern entries with indices no less than the total number of wedgelet patterns can also be filled with a first valid wedgelet pattern in the wedgelet pattern table, or a last valid wedgelet pattern in the wedgelet pattern table, or a default wedgelet pattern.

BRIEF DESCRIPTION OF DRAWINGS

FIG. 1A illustrates an example of wedgelet partition corresponding to a case for the continuous signal and the separation line can be described by an equation for a straight line.

FIG. 1B illustrates an example of wedgelet partition for a case of the discrete sample space.

FIG. 1C illustrates an example of wedgelet pattern corresponding to the case in FIG. 1B.

FIG. 2A illustrates an example of contour partition corresponding to a case for the continuous signal.

FIG. 2B illustrates an example of contour partition for a case of the discrete sample space.

FIG. 2C illustrates an example of contour pattern corresponding to the case in FIG. 2B.

FIG. 4A-FIG. 4F illustrate examples of starting positions and ending positions of available wedgelet candidates in various wedgelet direction categories for a reduced wedgelet pattern table according to an embodiment of the present invention, where the starting positions and ending positions are constrained at even positions and the wedgelet direction category corresponds to left-bottom corner direction (FIG. 4A), bottom-right corner direction (FIG. 4B), vertical direction (FIG. 4C), left-up corner direction (FIG. 4D), up-right corner direction (FIG. 4E) and horizontal direction (FIG. 4F).

FIG. 5A-FIG. 5B illustrate another embodiment of the present invention, where the wedgelet patterns for corner directions are the same as those in FIGS. 4A-B and FIGS. 4D-E. For vertical direction (FIG. 5A) and horizontal direction (FIG. 5B), only the starting positions are constrained at even positions.

DETAILED DESCRIPTION

Figure 3A:
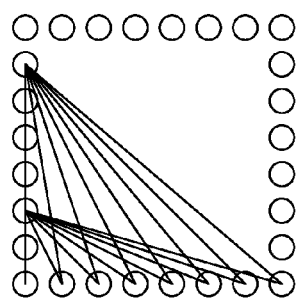
FIG. 3A-FIG. 3F illustrate examples of starting positions and ending positions of available wedgelet candidates in various wedgelet direction categories, where the wedgelet direction category corresponds to adjacent-edge direction (FIG. 3A, FIG. 3B, FIG. 3D and FIG. 3E) and opposite-edge direction (FIG. 3C and FIG. 3F).
Figure 3B:
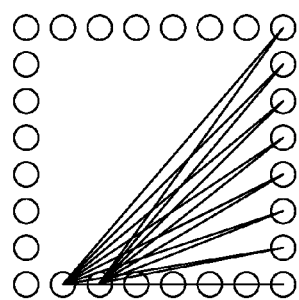
Figure 3C:
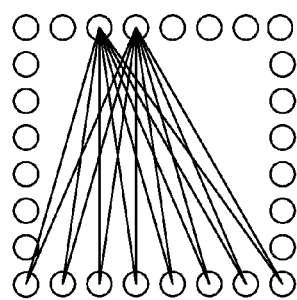
Figure 3D:
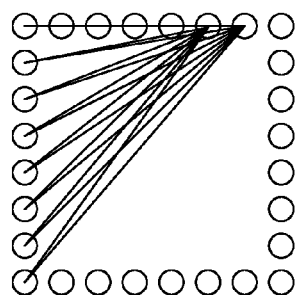
Figure 3E:
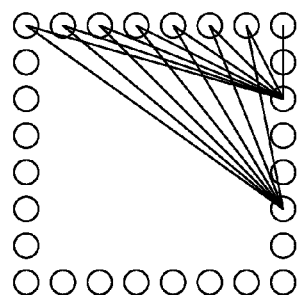
Figure 3F:
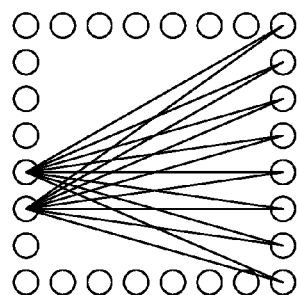

The following description is of the best-contemplated mode of carrying out the invention. This description is made for the purpose of illustrating the general principles of the invention and should not be taken in a limiting sense. The scope of the invention is best determined by reference to the appended claims.

In order to reduce the wedgelet pattern table size associated with DMM1 (depth modelling mode 1), three types of wedgelet pattern table size reduction method are disclosed. According to the first-type wedgelet pattern table size reduction, constraints are applied to the starting or ending points (also referred as the starting or ending positions) of the available wedgelet candidates, or the available wedgelet direction categories. According to the second-type wedgelet pattern table size reduction, the starting and ending points of the wedgelets in the tables are down scaled (also referred as down sampled) for larger PUs (prediction units). The down-scaled wedgelet candidates are used for smaller Intra PUs. The wedgelet pattern table can also be used by a larger PU by up scaling the wedgelet patterns in the wedgelet pattern table. According to the third-type wedgelet pattern table size reduction, the total number of available wedgelets is limited to a fixed number while adding wedgelet pattern into the wedgelet pattern list. No new wedgelet pattern is added when the wedgelet list is full.

Accordingly, a first embodiment based on the first-type wedgelet pattern table size reduction is to constrain the starting position (x, y) according to:

$$x \% k == m, \text{ where } m < k, \text{ and} \qquad (1)$$

$$y \% t == n, \text{ where } n < t. \qquad (2)$$

In the above equations, "%" corresponds to the "modulo" operation and m, n, k and t are positive integers. Equation (1) corresponds to every k-th samples of the edge samples in the x-direction and m refers to an offset (also referred as phase in this disclosure) in the down-scaled position. When x is divisible by k, m is equal to 0. For example, if k=2 and m=0, every other edge even samples are used in the x-direction. If k=2 and m=1, every other odd samples are used in the x-direction. Similarly, equation (2) corresponds to every t-th edge samples in the y-direction.

A second embodiment based on the first-type wedgelet pattern table size reduction is to constrain the ending point position (x, y) by x % k==m and y % t==n, where m<k, and n<t. Similar to the case for the starting positions, the ending positions are constrained to every k-th edge samples in the x-direction and every t-th edge samples o in the y-direction.

A third embodiment based on the first-type wedgelet pattern table size reduction is to constrain the ending point position (x, y) to be from a limited set of values, such as x<k or y<t, where k is smaller than the block width and t is smaller than the block height.

The fourth embodiment based on the first-type wedgelet pattern table size reduction is to constrain the starting point position (x, y) to be from a limited set of values, such as x<k or y<t, where k is smaller than the block width and t is smaller than the block height.

A fifth embodiment based on the first-type wedgelet pattern table size reduction is to constrain the starting point or ending point only for a selected subset of PU sizes. For example, the first through the fourth embodiments as mentioned above can be applied to PUs larger than a selected size, such as 16×16.

A sixth embodiment based on the first-type wedgelet pattern table size reduction is to constrain the starting point or ending point to each wedgelet direction categories among the 6 wedgelet categories. For example, FIG. 4A-FIG. 4F illustrate examples of selected wedgelet pattern subset corresponding to FIG. 3A-FIG. 3F respectively, where the coordinates of the starting and ending points are constrained to be even values. In another embodiment, the starting and ending positions are constrained to be at even positions on for corner directions as shown in FIGS. 4A-4B and FIGS. 4D-4E. However, for the vertical direction and the horizontal direction, only the ending positions are constrained to be at even positions as shown in FIG. 5A and FIG. 5B respectively. In the foregoing embodiments, the circles filled with cross lines represent the corner samples, and the circles filled with dots represent the samples corresponding to the starting and ending positions. The starting and ending positions constrained to be at even positions correspond to even non-corner samples, where each even non-corner sample has an even sample distances from the corner sample.

A seventh embodiment based on the first-type wedgelet pattern table size reduction is to only utilize the wedgelet patterns from a selected subset A of all the wedgelet direction categories. Let L denote size of A, L is smaller than 6. For example, only the wedgelet patterns from the vertical direction and the horizontal direction will be included into the wedgelet pattern table.

Any combination of the embodiments based on the first-type wedgelet pattern table size reduction as mentioned above can be used to further improve the coding efficiency.

A first embodiment based on the second-type wedgelet pattern table size reduction is to re-use the wedgelet pattern tables associated with n1×n1 size Intra prediction for n2×n2 size Intra prediction, where n1 and n2 are positive integers, and n2 is smaller than n1. In other words, there is no need to store wedgelet pattern table for n2×n2 size Intra prediction since it can use n1×n1 wedgelet pattern table.

When a smaller size wedgelet pattern table shares (i.e., "re-use") a larger wedgelet pattern table as mentioned above, the smaller size wedgelet pattern table can be generated by down scaling the wedgelet patterns in the table used for the larger Intra PUs. The down-scaled table is then utilized for the smaller Intra PUs.

According to another embodiment based on the second-type wedgelet pattern table size reduction, when processing a pixel at position (x,y) of a smaller PU with size n×n, the value at position (k×x, k×y) in the wedgelet pattern table of a larger PU with size m×m can be utilized, where k, m and n are positive integers and k is equal to m/n.

Any combination of the embodiments based on the second-type wedgelet pattern table size reduction as mentioned above can be used to further improve the coding efficiency.

One embodiment based on the third-type wedgelet pattern table size reduction is to constrain total available wedgelet number (or the table size) of the k×k Intra PU to be n to the power of 2 (i.e., $2^n$), where n is a positive integer. A larger n can be used for larger Intra coded PUs.

When adding one wedgelet pattern into the wedgelet list, the wedgelet is only added when the corresponding wedgelet list for the current Intra PU is not full (or total wedgelet storage size is not larger than the table size).

Another embodiment based on the third-type wedgelet pattern table size reduction is to only select limited wedgelet patterns for each wedgelet direction category to make the total wedgelet storage size be smaller than a pre-defined table size.

Any combination of the embodiments based on the third-type wedgelet pattern table size reduction as mentioned above can be used to further improve the coding efficiency.

Furthermore, any combination of the embodiments based on any combination of the first-type, the second-type and the third-type wedgelet pattern table size reductions as mentioned above can be used to further improve the coding efficiency.

As mentioned before, when the condition: wedge_full_tab_idx>=NumWedgePattern[log2BlkSize] occurs, the decoder may not work properly for wedge_full_tab_idx signaled in the bitstream. In order to overcome the issue, various embodiments are disclosed.

In one embodiment, wedge_full_tab_idx signaled in the bit-stream is constrained to be lower than NumWedgePattern[log2BlkSize]. If wedge_full_tab_idx signaled in a bit-stream is not lower than NumWedgePattern[log2BlkSize], the bit-stream will be considered as invalid.

In another embodiment, wedge_full_tab_idx is clipped to a valid range to access the wedgelet pattern in the wedgelet pattern list. For example, a clipped wedge_full_tab_idx can be used to access the wedgelet pattern:

wedgePattern=WedgePatternTable[log2BlkSize][clipped_wedge_full_tab_idx]

where the clipped wedge_full_tab_idx is derived according to:

clipped_wedge_full_tab_idx=Clip3(0, NumWedgePattern[log2BlkSize]−1, wedge_full_tab_idx[xTb][yTb])

In one embodiment, if wedge_full_tab_idx points to an invalid entry in WedgePatternTable[log2BlkSize], a valid entry in WedgePatternTable[log2BlkSize] will be used instead. The valid entry may correspond to a fixed entry in the table, or it may depend on wedge_full_tab_idx. For example, WedgePatternTable[log2BlkSize] [0] is used if wedge_full_tab_idx is larger than NumWedgePattern[log2BlkSize]−1.

In another embodiment, all entries that may be accessed by wedge_full_tab_idx in WedgePatternTable[log2BlkSize] are constructed. For example, WedgePatternTable[log2BlkSize] is constructed with $2^{wedgeFullTabIdxBits[log2BlkSize]}$ entries, so that wedge_full_tab_idx is valid for any value from 0 to $2^{wedgeFullTabIdxBits[log2BlkSize]}-1$.

In another embodiment, the entries in WedgePatternTable[log2BlkSize] with indices larger than NumWedgePattern[log2BlkSize]−1 are filled with some wedgelet patterns. A filled wedgelet patterns can be identical to an existing pattern in WedgePatternTable[log2BlkSize] with the index lower than NumWedgePattern [log2BlkSize], or it can be a new pattern which is not in the entries with the index from 0 to NumWedgePattern[log2BlkSize]−1 in WedgePatternTable [log2BlkSize].

Alternatively, all the entries in WedgePatternTable[log2BlkSize] with indices larger than NumWedgePattern[log2BlkSize]−1 can be set to the last valid pattern in the WedgePatternTable, i.e., WedgePatternTable [NumWedgePattern[log2BlkSize]−1].

All the entries in WedgePatternTable[log2BlkSize] with indices larger than NumWedgePattern[log2BlkSize]−1 can also be set to the first valid pattern in the WedgePatternTable, i.e., WedgePatternTable[0].

In one embodiment, all the entries in WedgePatternTable are first initialized to a default wedgelet pattern. The default wedgelet pattern can be partition 2N×N, partition N×2N, or one of AMP partitions.

Alternatively, all the entries in WedgePatternTable[log2BlkSize] with indices larger than NumWedgePattern[log2BlkSize]−1 can be set to a default pattern. The default pattern can be partition 2N×N, partition N×2N, or one of AMP partitions.

In one embodiment, the wedge_full_tab_idx in the WedgePatternTable is binarized as a variable length code with NumWedgePattern[log2BlkSize] entries. Therefore, the decoded wedge_full_tab_idx will be from 0 to NumWedgePattern[log2BlkSize]−1.

Figure 6:
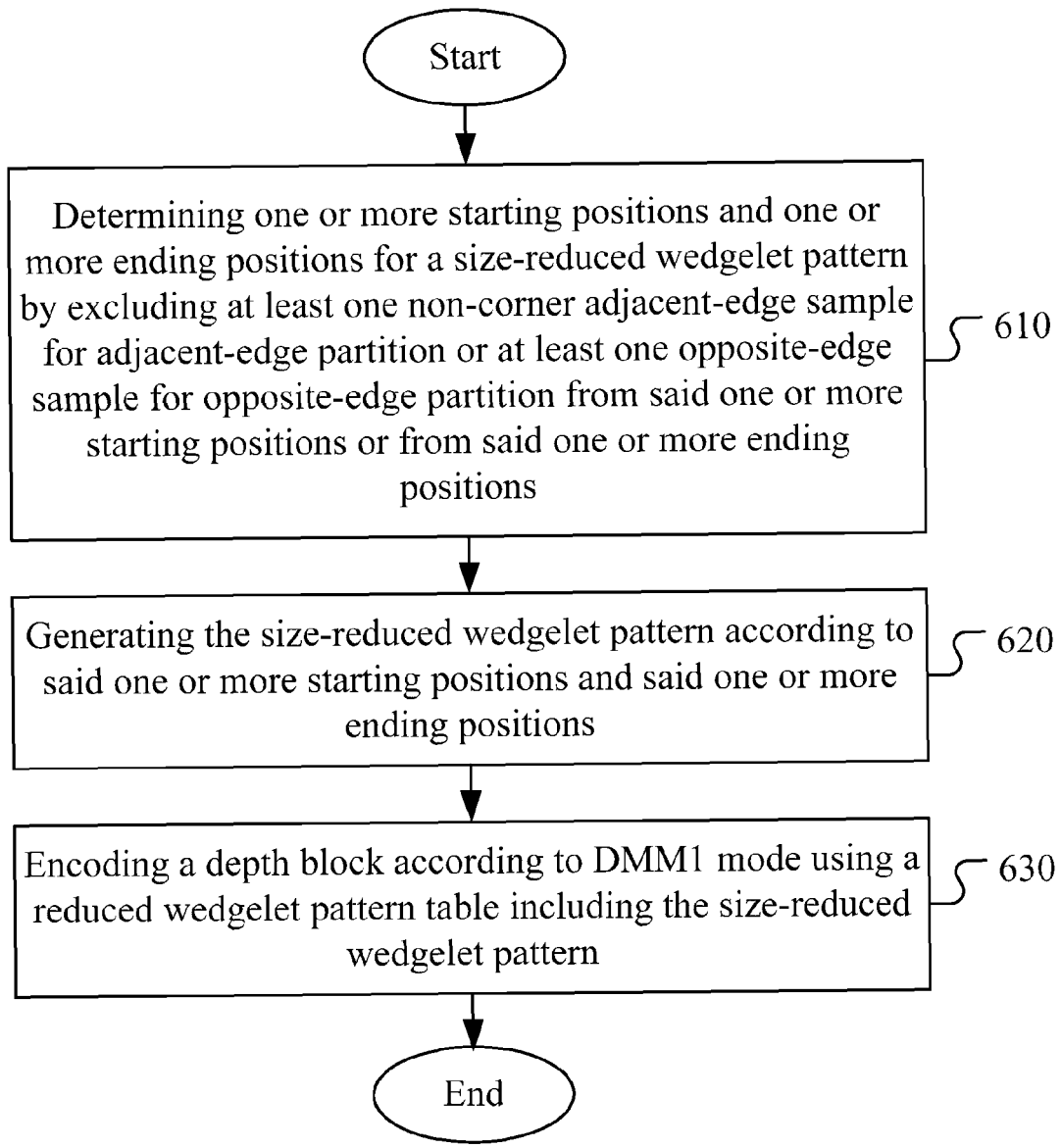
FIG. 6 illustrates an exemplary flowchart for an encoder system incorporating reduced wedgelet pattern table according to an embodiment of the present invention.

FIG. 6 illustrates an exemplary flowchart for an encoder system incorporating reduced wedgelet pattern table according to an embodiment of the present invention. The system determines one or more starting positions and one or more ending positions for a size-reduced wedgelet pattern by excluding at least one non-corner adjacent-edge sample for adjacent-edge partition or at least one opposite-edge sample for opposite-edge partition from said one or more starting positions or from said one or more ending positions in step 610. The size-reduced wedgelet pattern is generated according to said one or more starting positions and said one or more ending positions in step 620. A depth block is encoded according to DMM1 mode using a reduced wedgelet pattern table including the size-reduced wedgelet pattern in step 630. A flowchart for the decoder side can be derived similarly.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of depth decoding using depth modelling mode 1 (DMM1) for a depth block in a three-dimensional (3D) or multi-view video coding system, the method comprising:
receiving a video bitstream including compressed data for a depth block;
determining, from the video bitstream, a reduced wedgelet pattern table including at least one size-reduced wedgelet pattern or at least one omitted wedgelet pattern in at least one wedgelet direction category, wherein at least one non-corner adjacent-edge sample for adjacent-edge partition or at least one opposite-edge sample for opposite-edge partition is excluded from one or more starting positions or from one or more ending positions, and said at least one size-reduced wedgelet pattern is generated according to said one or more starting positions and said one or more ending positions; and
decoding, from the compressed data, the depth block according to DMM1 mode using the reduced wedgelet pattern table.

2. The method of claim 1, wherein for the adjacent-edge partition, said one or more starting positions correspond to even non-corner adjacent-edge samples in a first adjacent edge and said one or more ending positions correspond to even non-corner adjacent-edge samples in a second adjacent edge.

3. The method of claim 2, wherein said even non-corner adjacent-edge samples in the first adjacent edge correspond to first selected adjacent-edge samples in the first adjacent edge having first even sample distances from a corner sample joining the first adjacent edge and the second adjacent edge, and wherein said even non-corner adjacent-edge samples in the second adjacent edge correspond to second selected adjacent-edge samples in the second adjacent edge having second even sample distances from the corner sample joining the first adjacent edge and the second adjacent edge.

4. The method of claim 1, wherein for the opposite-edge partition, said one or more starting positions correspond to even opposite-edge samples in a first opposite edge and said one or more ending positions include all opposite-edge samples in a second opposite edge.

5. The method of claim 4, wherein said even opposite-edge samples in the first opposite edge correspond to selected opposite-edge samples in the first opposite edge having even sample distances from a corner sample in the first opposite edge.

6. The method of claim 1, wherein said decoding the depth block according to DMM1 mode using the reduced wedgelet pattern table including said at least one size-reduced wedgelet pattern is applied to the depth block only when the depth block corresponds to a prediction unit with a block size equal to or larger than 16×16.

7. The method of claim 1, wherein the depth block corresponds to a prediction unit (PU).

8. The method of claim 1, wherein the reduced wedgelet pattern table comprises at least one size-reduced wedgelet pattern in each wedgelet direction category.

9. The method of claim 1, wherein said one or more starting positions or said one or more ending positions correspond to every k-th non-corner adjacent-edge samples with phase t, wherein k is a positive integer and t is a non-negative integer smaller than k.

10. The method of claim 1, wherein said at least one non-corner adjacent-edge sample for the adjacent-edge partition or said at least one opposite-edge sample for the opposite-edge partition excluded from said one or more starting positions or from said one or more ending positions depend on a block size of the depth block or a wedgelet direction category.

11. The method of claim 10, wherein said at least one non-corner adjacent-edge sample for the adjacent-edge partition or said at least one opposite-edge sample for the opposite-edge partition is excluded from said one or more starting positions or from said one or more ending positions only for the block size of the depth block equal to or larger than a threshold.

12. The method of claim 1, wherein the reduced wedgelet pattern table includes said at least one omitted wedgelet pattern in said at least one wedgelet direction category only for a block size of the depth block equal to or larger than a threshold.

13. The method of claim 1, wherein the reduced wedgelet pattern table includes said at least one omitted wedgelet pattern in said at least one wedgelet direction category only for a block size of the depth block smaller than a threshold.

14. The method of claim 1, wherein one reduced wedgelet pattern table for a current depth block is used as a shared wedgelet pattern table by another depth block having a different block size from the current depth block.

15. The method of claim 1, wherein a table size of the reduced wedgelet pattern table is pre-defined to a fixed value for each block size of the depth block, and a required table size associated with a number of wedgelet candidates is no larger than the fixed value for each block size of the depth block.

* * * * *